March 16, 1965    A. E. BREED ETAL    3,173,307
CONTROL MECHANISM
Filed March 18, 1964    2 Sheets-Sheet 1
FIG. 1
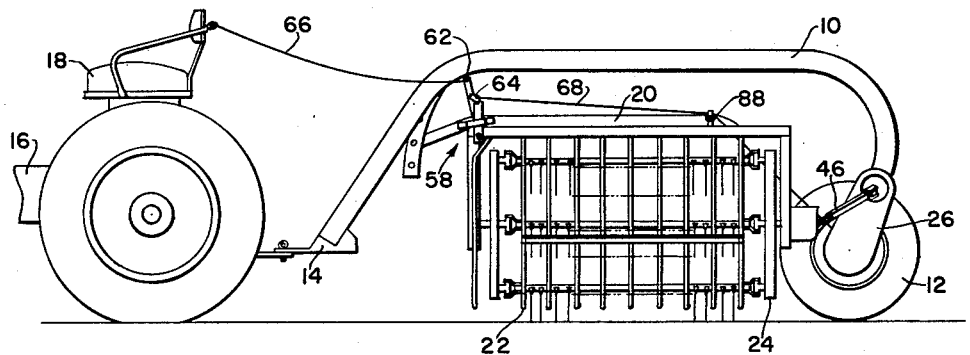
FIG. 2
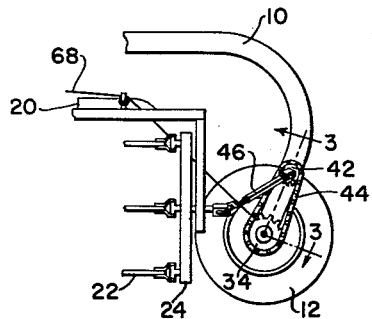
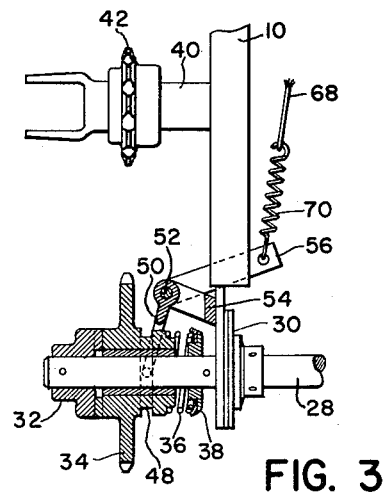
FIG. 3
INVENTORS
A.E.BREED & E.F.WILKINSON

INVENTORS
A.E. BREED & E.F. WILKINSON 3,173,307
CONTROL MECHANISM
Arie E. Breed and Edward F. Wilkinson, both of Ottumwa, Iowa, assignors to Deere & Company, Moline, Ill., a corporation of Delaware
Filed Mar. 18, 1964, Ser. No. 352,755
4 Claims. (Cl. 74—535)

This invention relates to a control mechanism and more particularly to such control mechanism as applied in the engaging and disengaging of a spring-loaded clutch.

Clutches of this type are commonly used in the agricultural machinery field to engage and disengage the drive according to operating conditions. One such example occurs in a side delivery rake in which the rake reel is driven by drive means from one of the ground wheels. This drive means incorporates a spring-loaded clutch. In the past, the clutch was connected to the reel basket in such manner that when the reel basket was raised the clutch would automatically disengage and vice versa. It has been found, however, that there are occasions when it is desirable to disengage the clutch irrespective of the position of the reel basket. Since the clutch is located at the rear end of the rake, it is relatively remote from the operator on the tractor seat and it is therefore necessary to provide some form of remote control. It is desirable that this control be of the type in which successive pulls on a trip rope, for example, will engage and disengage the clutch, relying upon a locked position of a lever, for example, to hold the clutch disengaged and utilizing the loading of the clutch to return the clutch to engaged condition when the lever is released.

It is accordingly the principal object of the present invention to provide an improved control mechanism of the general character noted. It is a further object to provide a control mechanism having a lever movable forwardly from a rear position to cause disengagement of the clutch, the lever being releasably lockable in the forward position to maintain the clutch disengaged. The arrangement is such that a successive forward movement of the lever will release the lever.

In the above regard, it is a significant object to arrange the lever and pawl mounting in such manner that the biasing force acting to engage the clutch controls respective positions of the pawl and lever so as to achieve the locked and unlocked conditions.

A further object is to provide a control mechanism that may be readily incorporated in side delivery rakes and other implements of existing designs.

The foregoing and other important objects and desirable features inherent in and encompassed by the invention will become apparent as a preferred embodiment thereof is disclosed; by way of example, in the ensuing description and accompanying sheets of drawings.

In the drawings:

FIG. 1 is a side elevational view of a typical side delivery rake shown attached to a tractor, a forward portion of the tractor being omitted.

FIG. 2 is a fragmentary view of the rear portion of the side rake, with the drive means shielding omitted so as to expose the drive.

FIG. 3 is an enlarged section taken taken on the staggered section line 3—3 of FIG. 2.

Figures 4, 5:
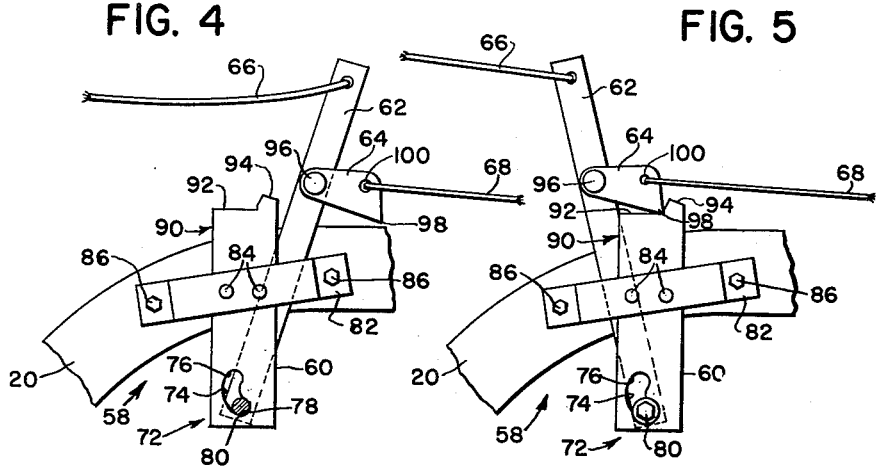
FIG. 4 is an enlarged fragmentary view of the control mechanism per se, the lever being shown in its rear position with the clutch spring-engaged.
FIG. 5 is a similar view showing the lever moved to a forward position prior to locking thereof by the pawl.

The side delivery rake chosen for purposes of illustration may be of the type shown in U.S. Patent 2,746,233, employing drive such as that in U.S. Patent 2,854,811. The rake comprises a main frame 10 carried on a pair of laterally spaced rear wheels 12, only one of which appears in the drawing. The forward end of the frame inclines downwardly and forwardly to a hitch clevis 14 which is attached to the drawbar of a typical tractor 16 having an operator's seat 18. Suspended from the main frame 10 in any suitable manner is a sub-frame or basket frame 20, and suspended from this is a typical rake reel 22, the rear spider 24 of which is driven from the near (here the left-hand) wheel 12. The drive means in FIG. 1 is substantially enclosed by shielding 26, but the details of the drive are available from FIGS. 2 and 3, wherein it is seen that the wheel 12 is keyed to a transverse axle 28 journaled in a bearing 30 at the lower end of the near side of the main frame 10. To the outer end of the axle 28 is affixed a clutch driving part 32 which is clutchable with and declutachable from a sprocket 34 loose on the axle 28. The sprocket 34, representing the driven part of the clutch, is biased into engagement with the driving part 32 by a coiled compression spring 36 acting between the sprocket and a collar 38 on the axle.

A stub shaft 40, projecting from the left-hand side of the main frame 10 above the left-hand end of the axle, carries thereon a sprocket 42 which is connected by a chain 44 to the lower sprocket 34. The sprocket 42 includes a universal joint part by means of which a telescopic shaft 46 establishes drive to the reel spider 24. As indicated, this drive is typical of that in the U.S. Patent 2,854,811. Such drive may be varied while still utilizing the principles of the present invention.

The sprocket 34 includes a hub provided with an annular groove 48 within which are received the arms of a shifter fork 50 mounted on a rockshaft 52 in turn supported by a bracket 54 at the lower end of the left side of the main frame 10 (FIG. 3). Rigidly secured to the rockshaft 52 is a clutch-operating arm 56, rockable upwardly and forwardly to shift the sprocket 34 axially to the right as seen in FIG. 3, thereby disengaging the sprocket from the driving clutch part 32. Release of force applied to the arm 56 enables the spring 36 to reengage the clutch.

Control of the clutch is accomplished from the tractor seat by the intermediary of the novel control mechanism, indicated in its entirety by the numeral 58. This is best shown in FIGS. 4–7.

The control mechanism comprises an upright support 60, a lever 62, a pawl 64, a control line such as a rope 66, which extends between the upper end of the lever 62 and the tractor seat, for example (FIG. 1) and a connection between the pawl and the clutch-operating arm 56, which may here be a cable 68 connected to the clutch-operating arm 56 by means of a relatively strong tension spring 70 (FIG. 3). The purpose of the spring is to accommodate overtravel of the parts during raising and lowering of the sub-frame and reel.

The lever is mounted at its lower end to the lower end of the support 60 by shiftable fulcrum means 72, here comprising a generally C-shaped slot 74 having upper and lower ends 76 and 78 respectively. The fulcrum means also includes a pin or shaft 80 (shown in section in FIG. 4 as being circular), mounting the lower end of the lever 62 and received in the slot for selective shifting between and seating in the opposite ends 76 and 78. As will be brought out below, the pin 80, when at the lower end 78 of the slot 74 affords a lower fulcrum and when at the upper end 76 affords an upper fulcrum.

At this point, it is well to observe that such expressions as "front," "rear," "upper" etc. are relative only and are used in the interests of convenience and clarity. In the particular case illustrated, the control mechanism 58 is mounted on a forward portion of the sub-frame 20 by means of a strap 82 fastened as at 84 to the support 60 and fastened to the sub-frame as by cap screws 86. Any other type of mounting could be utiilzed. Since the control mechanism 58 is forwardly remote from the clutch 32-34, the cable 68 is perforce trained over one or more intermediate guides, one such guide being shown as a pulley 88 at a rear portion of the sub-frame. The general line of force from the pawl 64 to the pulley 88 is rearwardly and somewhat downwardly, the cable extending thence downwardly and rearwardly to the clutch-operating arm 56. It will of course be understood that the rockshaft 52 is mounted at the appropriate angle so that pull on the portion of the cable between the sheave or pulley 88 and the arm 56 will accomplish easy disengagement of the clutch.

Figures 6, 7:
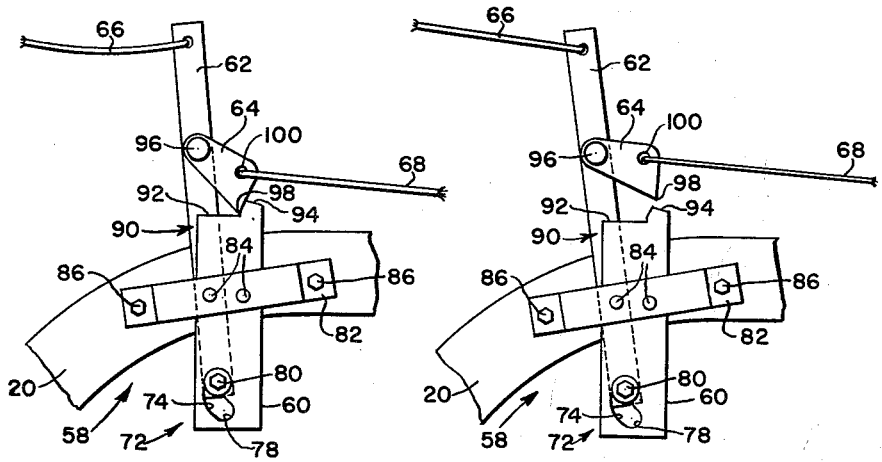
FIG. 6 shows the lever locked in its forward position.
FIG. 7 shows the pawl released so that the lever can return to its FIG. 4 position.

In the posture of the control mechanism 58 as shown in FIG. 1, the parts occupy the same respective positions that they do in FIG. 6; that is to say, the lever 62 is locked in a forward position, the cable 68 is tensioned and therefore the clutch-operating arm 56 is rocked upwardly and forwardly so as to disengage the clutch. Tension is applied to the cable 68, of course, by the clutch engaging spring 36. At this time, the pull rope 66 between the lever 62 and the tractor will be slack.

The locked condition of the lever 62 (FIGS. 1 and 6) is achieved by engagement of the pawl 64 with pawl control means 90 formed on the upper end of the support 60. This means includes a fore-and-aft top edge 92 and an integral stop 94 rising from the edge.

The pawl is pivoted at its forward end to the lever 62 on a transverse pivot axis 96 above the pawl control means 90. The pawl further has a rear nose 98 and an opening 100 which affords a connection point for the front end of the cable 68.

When the lever 62 is in its rear position, the clutch is engaged. The cable 68 will be relatively loose, since the spring 36, after the clutch is engaged, ceases to pull on the cable. Nevertheless, the rearward biasing force exerted by the cable 68 is sufficient to exert a line of force from the point of tangency of the cable 68 with the pulley 88 and the pivotal connection 96 of the pawl 64 to the lever 62. If the cable is tightened at all, this line of force is a straight line passing through the connection point 100. It is to be noted also that in the rear position of the lever 62, the pawl 64 is totally rearwardly clear of the pawl control means 90. The downward component in the rearward force acting on the pawl 64 is also sufficient to cause the nose 98 of the pawl to occupy a level below that of the top edge 92 of the pawl control means 90 (FIG. 4).

When the operator desires to disengage the clutch, he exerts a forward pull on the pull rope 66 so as to swing the lever 62 to the position of FIG. 5, the nose of the pawl ratcheting of course over the stop 94 and ending up riding or resting on the top edge 92. The nose of the pawl at this time is at a level higher than it was in FIG. 4. Therefore, the downward component on the pawl 64, together with the rearward component, is such that, when the operator releases the rope 66, the rearward and downward forces cause the pawl to rock about a fulcrum established between the nose 98 and front edge of the stop 94, raising the pawl in a clockwise direction (FIG. 6) and exerting a lifting force on the lever 62 via the pivot 96, thereby raising the fulcrum pin 80 to the upper end 76 of the C-shaped slot 74. The pawl at this time acts as a strut between the stop 94 and the lever 62, holding the lever in this position and keeping the cable 68 tight so as to hold the clutch disengaged against the bias in the clutch spring 36.

Reengagement of the clutch is establishing by another forward pull on the pull rope 66, swinging the lever 62 far enough forwardly to clear the nose of the pawl from the front edge of the stop 94. It would be noted that in FIG. 6 the line of force is exerted on the pawl at the connection point 100 which is intermediate the nose 98 and the pivot 96. Consequently, when the nose 98 is free of the stop 94, there is a lifting component which raises the pawl as the line of force tends to act along a straight line from the sheave 88 to the pawl pivot pin 96. Since the pivot pin 80 is at the upper end of the slot 74, the pawl nose 98 readily clears the stop 94 (FIG. 7), and, when the the operator releases the rope 66, the bias in the cable 68, because of the clutch spring 36, swings the lever back to its FIG. 4 position, and the clutch of course becomes reengaged. Of course, the pin 80 returns to the lower end 78 of the slot 74, and the mechanism is conditioned for reactivation to engage and disengage the clutch by successive pulls on the rope 66.

The mechanism is simply constructed and has few moving parts. Further, it is readily adapted for attachment to existing implements.

Features and advantages other than those categorically enumerated will readily occur to those versed in the art, as will many modifications and alterations in the preferred embodiment disclosed, all of which may be achieved without departure from the spirit and scope of the invention.

What is claimed is:

1. In combination: a support having upper and lower ends; a lever alongside the support and rising from a lower end adjacent to the support lower end to an upper end beyond the support upper end; shiftable fulcrum means mounting the lever lower end on the support lower end for fore-and-aft rocking selectively about vertically spaced upper and lower fulcra; pawl control means on said upper support end, including a fore-and-aft top edge and a rear stop rising from said edge; a pawl pivoted to the lever on an axis parallel to the fulcra axes and above said top edge and having a rear nose and a rear connecting point above said nose; said lever having a rear position rocked about the lower fulcrum and disposing the pawl rearwardly clear of the pawl control means; biasing means acting on the pawl connecting point to exert a force having a rearward component urging the lever to said rear position and a downward component disposing the pawl nose at a level below said top edge and retaining the lever in the position of the lower fulcrum; said lever being forcibly rockable forwardly against said force and about said lower fulcrum to cause the pawl nose to ratchet over said stop and to engage said top edge and thereby to elevate said connecting point so that, when the forward moving force on the lever is removed, the biasing force acts to move the pawl nose rearwardly against the stop and then to rock the pawl upwardly and rearwardly about the stop-engaged nose to elevate the lever to the upper fulcrum and to raise the pawl pivot axis to a level higher than the connecting point, whereby the biasing force exerts a lifting component on the pawl smaller than the force holding the pawl nose against the stop; said lever being forcibly rockable forwardly about the upper fulcrum to free the pawl nose from the stop for raising of the pawl nose clear of the stop by said lifting component so that upon removal of the forward moving force on the lever it returns to its aforesaid rear position and returns also to the lower fulcrum.

2. The invention defined in claim 1, in which: the support includes a rear portion rearwardly remote from the lever and generally at the level of the pawl and the biasing means includes a tension element extending forwardly from said portion and connected to said pawl connecting point.

3. The invention defined in claim 1, in which: the fulcrum means includes a slot in the lower support end and having upper and lower ends, and a pin carrying the lower end of the lever and received by the slot for shifting between said upper and lower ends to provide said upper and lower fulcra.

4. The invention defined in claim 3, in which: said slot is generally C-shaped and the upper end is forwardly of as well as higher than said lower end.

References Cited by the Examiner
UNITED STATES PATENTS 2,826,933   3/58   Schumacher _____ 74—535

BROUGHTON G. DURHAM, *Primary Examiner.*